United States Patent
Utsumi et al.

(10) Patent No.: US 7,212,228 B2
(45) Date of Patent: May 1, 2007

(54) AUTOMATIC CAMERA CALIBRATION METHOD

(75) Inventors: Akira Utsumi, Kyoto (JP); Hirotake Yamazoe, Kyoto (JP)

(73) Assignee: Advanced Telecommunications Research Institute International (JP)

( * ) Notice: Subject to any disclaimer, the term of this patent is extended or adjusted under 35 U.S.C. 154(b) by 580 days.

(21) Appl. No.: 10/345,175

(22) Filed: Jan. 16, 2003

(65) Prior Publication Data

US 2003/0156189 A1 Aug. 21, 2003

(30) Foreign Application Priority Data

Jan. 16, 2002 (JP) ............................. 2002-007904

(51) Int. Cl.
*G03B 1/00* (2006.01)
*H04N 7/18* (2006.01)

(52) U.S. Cl. ...................................... 348/139

(58) Field of Classification Search ................ 348/139, 348/159, 169, 157; 345/757, 475; *H04N 7/18; G03B 1/00*
See application file for complete search history.

(56) References Cited

U.S. PATENT DOCUMENTS

| | | | | |
|---|---|---|---|---|
| 5,764,786 A | * | 6/1998 | Kuwashima et al. | 382/107 |
| 5,889,550 A | * | 3/1999 | Reynolds | 348/139 |
| 5,912,980 A | * | 6/1999 | Hunke | 382/103 |
| 6,567,116 B1 | * | 5/2003 | Aman et al. | 348/169 |
| 6,950,123 B2 | * | 9/2005 | Martins | 348/157 |
| 6,980,229 B1 | * | 12/2005 | Ebersole, Jr. | 348/169 |
| 7,027,083 B2 | * | 4/2006 | Kanade et al. | 348/159 |
| 2002/0190991 A1 | * | 12/2002 | Efran et al. | 345/475 |
| 2003/0210329 A1 | * | 11/2003 | Aagaard et al. | 348/159 |
| 2004/0104935 A1 | * | 6/2004 | Williamson et al. | 345/757 |

* cited by examiner

*Primary Examiner*—Tung Vo
(74) *Attorney, Agent, or Firm*—Rader, Fishman & Grauer PLLC

(57) ABSTRACT

In an automatic camera calibration method in a system comprising a plurality of cameras, the automatic camera calibration method is characterized in that for each of the cameras, the estimated values of the position and posture of the camera are updated on the basis of observation information shared with the surrounding cameras and the estimated values of the respective current positions and postures of the surrounding cameras. An example of the observation information is the two-dimensional coordinate value of an image to be observed on an image plane of the camera and the size of the image to be observed.

8 Claims, 11 Drawing Sheets

AUTOMATIC CAMERA CALIBRATION METHOD

BACKGROUND OF THE INVENTION

1. Field of the Invention

The present invention relates to an automatic camera calibration method.

2. Description of the Prior Art

The inventors of the present invention have aimed at a non-contact interface with a computer, and have examined a method of detecting human motion by image processing (see the following documents 1, 2, and 3).

Document 1: Hiroki Mori, Akira Utsumi, Jun Ohya, and Masahiko Yachida. Human tracking system using adaptive camera selection. In Proc. of RO_MAN'98, pp. 494–499, 1998.

Document 2: Hiroki Mori, Akira Utsumi, Jun Ohya, and Masahiko Yachida. Examination of method of tracking a plurality of persons using asynchronous multi-viewpoint information. IEICE Technical Report, PRMU98-178, pp. 15–22, 1999.

Document 3: Howard Yang, Akira Utsumi, and Jun Ohya. Stabilization of tracking of a plurality of persons using asynchronous multi-viewpoint image. IEICE Technical Report, PRMU99-150, pp. 1–7, 1999.

Considered as information related to human motion are various types of information. Here, several operations including extraction of a facial image, the height, the color of clothes, etc. which are required to identify each of persons, detection of the position and the movement direction which are required for tracking, and a seating operation are examined. By detecting information related to the operations, applications such as interaction in a virtual environment and a monitoring system are possible.

There have been conventionally a lot of suggestions about tracking of a person using an image. Many of the suggestions are by a single- or double-eye image (see the following documents 4, 5, 6, and 7) and have some problems. For example, they cannot cope with occlusion, and a detection area is narrow.

Document 4: D. M. Gavrila and L. S. Davis. 3-d model-based tracking of humans in action: a multi-view approach. In Proc. of CVPR'96, pp. 73–80, 1996.

Document 5: Ali Azarbayejani and Alex Pentland. Real-time self-calibrating stereo person tracking using 3-d shape estimation from blob features. In 13-th International Conference on Pattern Recognition, pp. 627–632, 1996.

Document 6: C. Wren, A. Azarbayejani, T. Darrell, and A. Pentland. P finder: Real-time tracking of the human body. In SPIE proceeding vol. 2615, pp. 89–98, 1996.

Document 7: M. Patrick Johnson, P. Maes, and T. Darrell. Evolving visual routines. In Proc. of Artificial Life IV, pp. 198–209, 1994.

In order to solve the problems, a person tracking system utilizing a multi-viewpoint image has been vigorously studied in recent years (see the following documents 8, 9, and 10). By utilizing the multi-viewpoint image, it is considered that the occurrence of occlusion is reduced, thereby making more stable detection possible.

Document 8: Jakub Segen and Sarma Pingali. A camera-based system for tracking people in real time. In Proc. of 13-th International Conference on Pattern Recognition, pp. 63–67, 1996.

Document 9: Q. Cai, A. Mitiche, and J. K. Aggarwal. Tracking human motion in an inddor environment. In Proc. of 2nd International Conference on Image Processing, pp. 215–218, 1995.

Document 10: Q. Cai, J. K. Aggarwal. Tracking human motion using multiple cameras. In Proc. of 13-th International Conference on Pattern Recognition, pp. 68–72, 1996.

In order to track human motion in a wide range by such a system, however, a lot of cameras are required in correspondence with detection areas, thereby causing many problems. For example, a lot of vision systems presuppose that cameras carry out observations at the same time for three-dimensional measurement, and the system becomes complicated by introducing a synchronous mechanism used therefor. Further, a plurality of observations simultaneously carried out increases redundancy among the observations, thereby reducing the processing efficiency of the system. Further, it is difficult to previously calibrate all a lot of cameras as the number of viewpoints (the number of cameras) increases.

It is considered that the problems become significant as the number of viewpoints to be utilized increases. In the tracking system utilizing the multi-viewpoint image, the inventors of the present invention have considered that the problems caused by enlarging the scale thereof are essential.

Therefore, the estimation of the position and posture of the camera (the calibration of the camera) in the tracking system utilizing the multi-viewpoint image will be considered. In the tracking system utilizing the multi-viewpoint image, it is important to also establish a method for maintenance and management such as a correspondence to the changes in the position and posture of the camera by failure during operation in addition to prior calibration of the camera.

Several methods have already been proposed with respect to the calibration of the camera in the tracking system utilizing the multi-viewpoint image.

In the following document 11, Saito et al. have found a fundamental matrix between two reference cameras and other cameras using an observation shared therebetween, to make it easy to construct a large-scaled three-dimensional video system.

Document 11: Hideo Saito and Takeo Kanade. Shape reconstruction in projective grid space from large number of images. In Proc. of CVPR, pp. 49–54, 1999.

Furthermore, in the following document 12, Lee et al. have proposed a method of finding, by an observation shared between a reference camera and each camera utilizing a target object moving on a plane, the relative position and posture from the reference camera.

Document 12: L. Lee, R. Romano, and G. Stein. Monitoring activities from multiple video streams: Establishing a common coordinate frame. IEEE Pattern Anal. Machine Intell., Vol. 22, No. 8, pp. 758–767, 2000.

However, the methods cannot be applied to a case where an observation is not shared between a camera to be calibrated and a reference camera.

Contrary to this, the inventors and others have proposed a method of estimating the position and posture of a camera utilizing the three-dimensional motion of a person who is being tracked (see the following document 13). In this method, however, a plurality of calibrated cameras are required to find the motion of the person.

Document 13: Hirotake Yamazoe, Akira Utsumi, Nobuji Tetsutani, and Masahiko Yachida. Automatic Camera calibration method for multiple camera based human tracking system. In Proc. of IWAIT 2001, pp. 77–82, 2001.

SUMMARY OF THE INVENTION

An object of the present invention is to provide an automatic camera calibration method in which all cameras need not share an observation with a reference camera, and a local observation which is not shared with the reference camera can be also utilized for estimating the respective positions and postures of the cameras.

Another object of the present invention is to provide an automatic camera calibration method capable of easily adding and deleting an observation section in a system for tracking a moving object utilizing a multi-viewpoint image.

In an automatic camera calibration method in a system comprising a plurality of cameras, the present invention is characterized by comprising the step of updating, for each of the cameras, the estimated values of the position and posture of the camera on the basis of observation information shared with the surrounding cameras and the estimated values of the respective current positions and postures of the surrounding cameras.

An example of the observation information is the two-dimensional coordinate value of an image to be observed on an image plane of the camera and the size of the image to be observed.

An example of processing for updating the estimated values of the position and posture of each of the cameras is one comprising a first step of calculating information related to the relative posture and relative position between the camera and the other surrounding cameras on the basis of the observation information shared with the other surrounding cameras and the estimated values of the respective current positions and postures of the camera and the other cameras, and a second step of updating the estimated values of the position and posture of the camera on the basis of the information related to the relative posture and relative position calculated in the first step.

Each of the cameras holds the estimated value of the posture of each of the surrounding cameras, information related to the estimation precision of the respective postures of the camera and each of the surrounding cameras, the estimated value of the position of each of the surrounding cameras, and the estimation precision of the respective positions of the camera and each of the surrounding cameras. The second step of updating the estimated values of the position and posture of each of the cameras comprises the steps of updating the estimated value of the posture of the camera on the basis of the information related to the relative posture calculated in the first step, the estimated value of the posture of each of the surrounding cameras which is held by the camera, and the information related to the estimation precision of the respective postures of the camera and each of the surrounding cameras, and updating the estimated value of the position of the camera on the basis of the information related to the relative position calculated in the first step, and the estimated value of the position of each of the surrounding cameras which is held by the camera, and the information related to the estimation precision of the respective positions of the camera and each of the surrounding cameras.

It is preferable that the processing for updating the estimated values of the position and posture of each of the cameras is performed every time new observation information is obtained in the camera. It is preferable that the posture in a world coordinate system of at least one camera and the positions in the world coordinate system of at least two cameras are given as bases in order to determine world coordinates,.

An example of the observation information is the two-dimensional coordinate value of an image to be observed on the image plane shared between at least the two cameras. In this case, in the processing for updating the estimated values of the position and posture of each of the cameras, processing for updating the estimated values of the position and posture of the camera on the basis of the observation information shared with the other surrounding cameras and the estimated values of the respective current positions and postures of the other cameras, for example, is performed in a distributed manner for the cameras.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
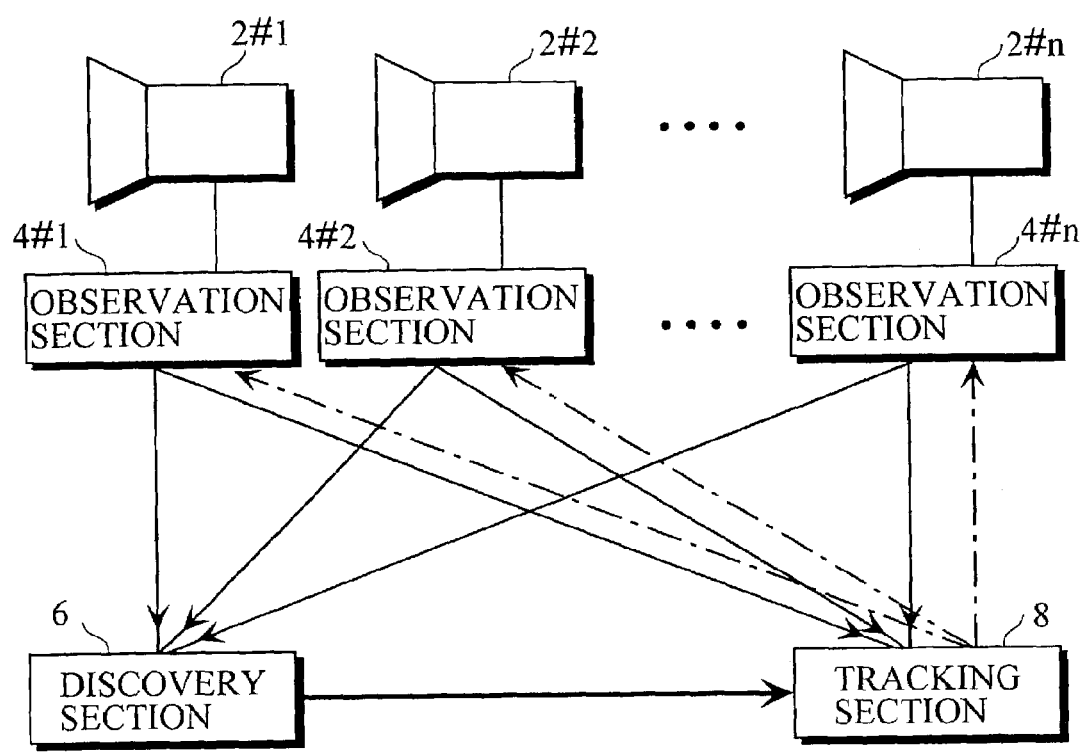
FIG. 1 is a block diagram showing the overall configuration of a person tracking system.

Referring now to the drawings, an embodiment of the present invention will be described.

A person tracking system utilizing an asynchronous multi-viewpoint image which has already been developed by the inventors and others of the present invention will be first described, and an automatic camera calibration method which characterizes the present invention will be thereafter described.

[1] Description of Person Tracking System

[1-1] Description of Overall Configuration of Person Tracking System

FIG. 1 illustrates the overall configuration of a person tracking system.

The person tracking system comprises cameras 2#1, 2#2, ..., 2#n (hereinafter generically referred to as a camera 2) observation sections 4#1, 4#2, ..., 4#n (hereinafter generically referred to as an observation section 4) respectively provided in correspondence with the cameras, a discovery section 6, and a tracking section 8. Each of the observation sections 4, the discovery section 6, and the tracking section 8 are respectively constructed by different computers, for example, and the computers are connected to one another by a LAN (Local Area Network).

Each of the observation sections 4 performs processing for extracting feature amounts on the basis of an input image obtained from the corresponding camera 2. The feature amounts (the position of a representative point, the position of a head vertex, the color of a clothes region, etc.) obtained by each of the observation sections 4 are made to correspond to a tracking model on the basis of information related to an estimated position sent from the tracking section 8. Thereafter, the feature amounts, together with information related to an observation time are then sent to the tracking section 8. The information sent to the tracking section 8 from each of the observation sections 4 after being made to correspond to the tracking model shall be referred to as observation information related to a corresponding point.

The feature amount which is not made to correspond to the tracking model is sent to the discovery section 6. The information sent to the discovery section 6 from each of the observation sections 4 when it is not made to correspond to the tracking model shall be referred to as observation information related to a non-corresponding point. The observation sections 4 are independently operated.

In the discovery section 6, a person who has newly appeared in a scene is detected using the non-corresponding point observation information sent from the observation section 4. Information (an initial value) related to the position of the new person is transmitted to the tracking section 8, where the tracking thereof by the tracking section 8 is started.

The tracking section 8 updates the states (the position, the directional angle, the height, etc.) of the new person using a Kalman filter by taking the new person position information as an initial value and taking the corresponding point observation information as an input value, to further estimate the position thereof on the basis of an observation model, described later. The estimated position information is transmitted to the observation section 4.

[1-2] Description of Observation Section

Processing performed by the observation section 4 will be described. First, an input image is divided into a person region and a background region. As a region dividing method, a method disclosed in the following document 14 can be used.

Document 14: Akira Utsumi, and Jun Ohya. Extraction of animal body region from time series image by estimation of pixel value distribution. Trans, IEICE, Vol. J81-D-II, No. 8, pp. 1768–1775, 1998.

The obtained person region is then subjected to distance transformation. That is, for each of pixels composing the person region, the shortest distance from the pixel to the boundary of the person region is found, to take the obtained distance as a transformed distance value of the pixel. As a result, each of the pixels in the person region which has been subjected to distance transformation has a transformed distance value corresponding to the shortest distance from the pixel to the boundary of the person region.

Figure 2:
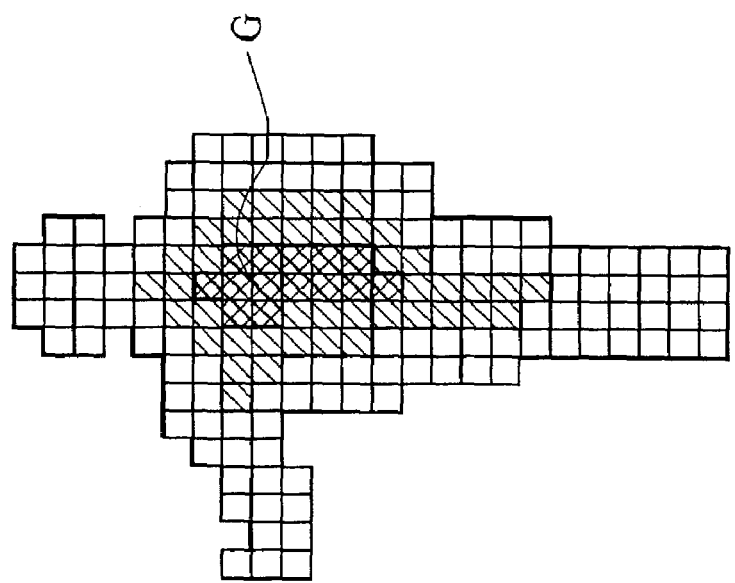
FIG. 2 is a schematic view for explaining processing for extracting a feature point by an observation section.
Figure 2:
Figure 2:
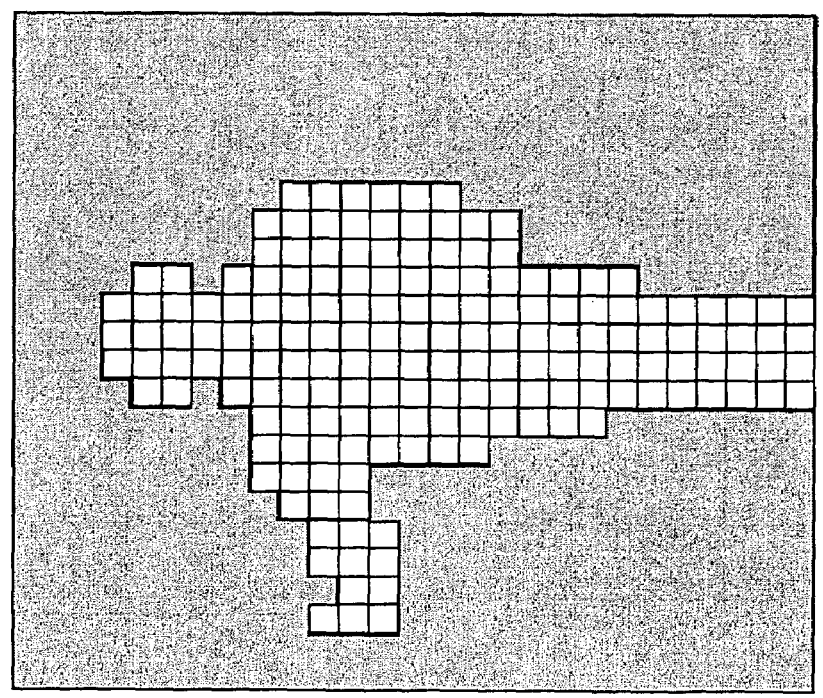

The left of FIG. 2 illustrates a binary image obtained by region segmentation, and the right of FIG. 2 illustrates an image obtained by distance transformation. As illustrated in the right of FIG. 2, the larger the transformed distance value of the pixel is, the blacker the color of the pixel is.

A point (a center of gravity) G at which the transformed distance value reaches a maximum in the person region is then selected as a representative point (feature point) in the region. Further, the positions of a head vertex and a toe point and information related to the color of a body portion are extracted from the image. The color information is used for a correspondence in image features between different cameras. The distance on the image between the head vertex and the toe point is utilized as the size of the feature point (representative point). Thereafter, a correspondence between the extracted feature point and the tracking model which has already been discovered is established.

Description is made of a method of establishing a correspondence between the extracted feature point and the tracking model which has already been discovered. It is assumed that a person moves at a constant speed in the tracking section 8, as described later. The estimated position of a person hj at a time t is indicated by a two-dimensional Gaussian distribution. Here, $X_{hj,t}$ is taken as the estimated position in a world coordinate (X, Y) system of the person hj at the time t, $\overline{X}_{hj,t}$ is taken as the average estimated position, and $\overline{S}_{hj,t}$ is taken as a covariance matrix.

The result of weak perspective projection of an estimated position distribution N ($\overline{X}$hj,t,$\overline{S}_{hj,t}$) on an image i is a one-dimensional Gaussian distribution n ($\overline{x}_{hj,t,i}$, $\overline{s}_{hj,t,i}$) composed of a probability $P_i$ ($x_i$) expressed by the following equation (1). The one-dimensional Gaussian distribution n ($\overline{x}_{hj,t,i}$,$\overline{s}_{hj,t,i}$) indicates the existence probability of the person on an image i. Here, $\overline{x}_{hj,t,i}$ denotes a value obtained by projecting $\overline{X}_{hj,t}$ on an image plane, and $\overline{s}_{hj,t,i}$ denotes a value obtained by projecting $\overline{S}_{hj,t}$ on the image plane:

$$P_i(x_i) = \frac{1}{2\pi \overline{s}_{hj,t,i}} \exp\left(\frac{-(x_i - \overline{x}_{hj,t,i})^2}{2\overline{s}_{hj,t,i}^2}\right) \quad (1)$$

The respective distributions of the height of the head vertex and the color of clothes are also considered, to take the feature point at which the occurrence probability of an observation value reaches a maximum against the tracking model as an observation corresponding to the person hj at an observation time and attach a label of hj thereto (see the foregoing document 3).

The feature point having the label attached thereto is transmitted to the tracking section 8 as corresponding point observation information. However, feature points which are made to respectively correspond to a plurality of persons are not transmitted because occlusion occurs at the time of the observation.

After the processing, when there exist feature points which are not made to respectively correspond to the plurality of persons, it is considered that the feature points belong to a new person. Accordingly, the feature points are sent to the discovery section 6 as non-corresponding point observation information (position and time).

[1-3] Description of Discovery Section

The discovery section 6 detects a person who has appeared on a new scene, and adds a corresponding model to the tracking section 8.

Since observation information is asynchronously acquired, a normal stereo correspondence cannot be applied as it is. Therefore, a correspondence (discovery) method using time series information utilizing the Kalman filter is used (see the foregoing document 2).

Updating processing using the Kalman filter is performed by selecting, out of the non-corresponding point observation information sent to the discovery section 6 from the observation section 4, the respective one observation information at different four times. If an error between an obtained estimated track and each of the observation information is within a predetermined threshold value, the error is taken as a set of feature points belonging to the new person, to transmit an estimated position at the newest observation time to the tracking section 8 as an initial discovery position.

[1-4] Description of Tracking Section

A person model which is being tracked is updated using image features which are made to correspond to the tracking model in each of the observation sections 4 (see the foregoing document 2).

Figure 3:
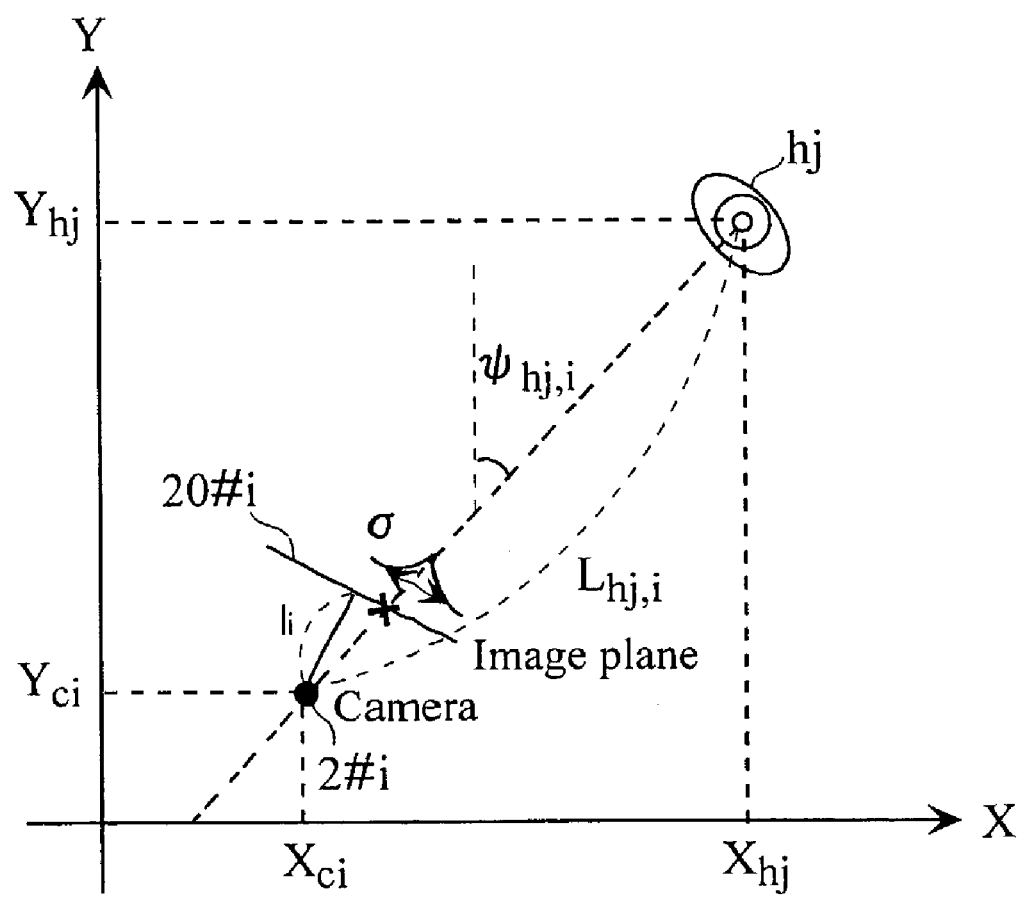
FIG. 3 is a schematic view showing an observation model used for estimating the position of a tracking section.

FIG. 3 illustrates an observation model used for position estimation. In FIG. 3, $l_i$ denotes the distance (focal length) between the camera 2#i and its image plane 20#i, and $L_{hj,i}$ denotes the distance between the camera 2#i and the person hj. $\phi_{hj,i}$ denotes an angle between a line connecting the camera 2#i and the person hj and the Y axis.

It is herein assumed that the person hj moves at a constant speed. The state of the person hj at the time t is expressed by the following equation (2) on the world coordinate (X, Y) system:

$$X_{hj,t} = [X_{hj,t}\ Y_{hj,t}\ \dot{X}_{hj,t}\ \dot{Y}_{hj,t}]' \quad (2)$$

$\dot{X}_{hj}$ having a mark "•" attached to its top indicates a speed in the X direction, and $\dot{Y}_{hj}$ having a mark "•" attached to its top indicates a speed in the Y direction. However, the initial state is determined by new model information transmitted from the discovery section 6. A mark "'" attached to a matrix indicates transposition.

It is herein assumed that one observation is carried out by the observation section 4#i. The observation can be expressed by the following equation (3) by observation information sent from the observation section 4#i:

$$HR^{-1}_{\varphi hj,t,i} C_i = HR^{-1}_{\varphi hj,t,i} X_{hj,t} + e \quad (3)$$

Here, $C_i$ denotes a camera position, and $R\phi_{hj,t,i}$ denotes a rotation in a clockwise direction through an angle $\phi_{hj,t,i}$ between an epipolar line and the Y axis (H=[1000]). e denotes an observation error, which is an average of zero, and is taken as a standard deviation $\sigma_{hj,t,i}$. $\sigma_{hj,t,i}$ is expressed by the following equation (4), considering that it increases as the distance from the camera increases.

$$\sigma_{hj,t,i} = \frac{L_{hj,t,i}}{l_i}\sigma \cong \frac{\overline{L}_{hj,t,i}}{l_i}\sigma \quad (4)$$

Here, the distance $L_{hj,t,i}$ between the camera position $C_i$ and the person state $X_{hj,t}$ is unknown. Accordingly, it is approximated by $\overline{L}_{hj,t,i}$ calculated by the estimated position $\overline{X}_{hj,t}$ of $X_{hj,t}$.

The Kalman filter is constituted by the above-mentioned observation model, to update the state of the person hj.

The updating processing is independently performed for the cameras, to estimate the state of the person. The estimation of the state of the person hj at a time t+1 is given by a Gaussian distribution where $\overline{X}_{hj,t+1}$ is taken as the average estimation, and $\overline{S}_{hj,t+1}$ is taken as a covariance matrix. The result of the estimation of the state is calculated and transmitted depending on a request from the observation section 4, and is utilized for a correspondence of feature points, as described above. The person model which has moved outward from the detection range is deleted, to stop the tracking of the person.

The above-mentioned person tracking system has the advantage that the observations by the cameras 2 are respectively processed by the independent observation sections 4, thereby making it easy to delete any of the cameras 2 and add a new camera. In such a distributed type tracking system, it is desired that the cameras are also independently maintained and managed with respect to information related to the position and posture of each of the cameras from the assurance of processing efficiency and failure resistance. A distributed type camera position and posture estimation algorithm which characterizes the present invention will be described.

[2] Description of Camera Position and Posture Estimation Algorithm (Camera Calibration Algorithm)

In order to simultaneously estimate the respective positions and postures of a lot of cameras, calibration information such as current estimated values and covariance matrices must be held. However, the amount of the calibration information which should be held increases as the number of cameras increases. Accordingly, it is difficult to hold information related to the estimation of the respective positions and postures of all the cameras in a one-dimensional manner in a large-scaled system.

Therefore, the information related to the estimation of the respective positions and postures of the cameras are held in a distributed manner for the cameras (observation sections).

Figure 4:
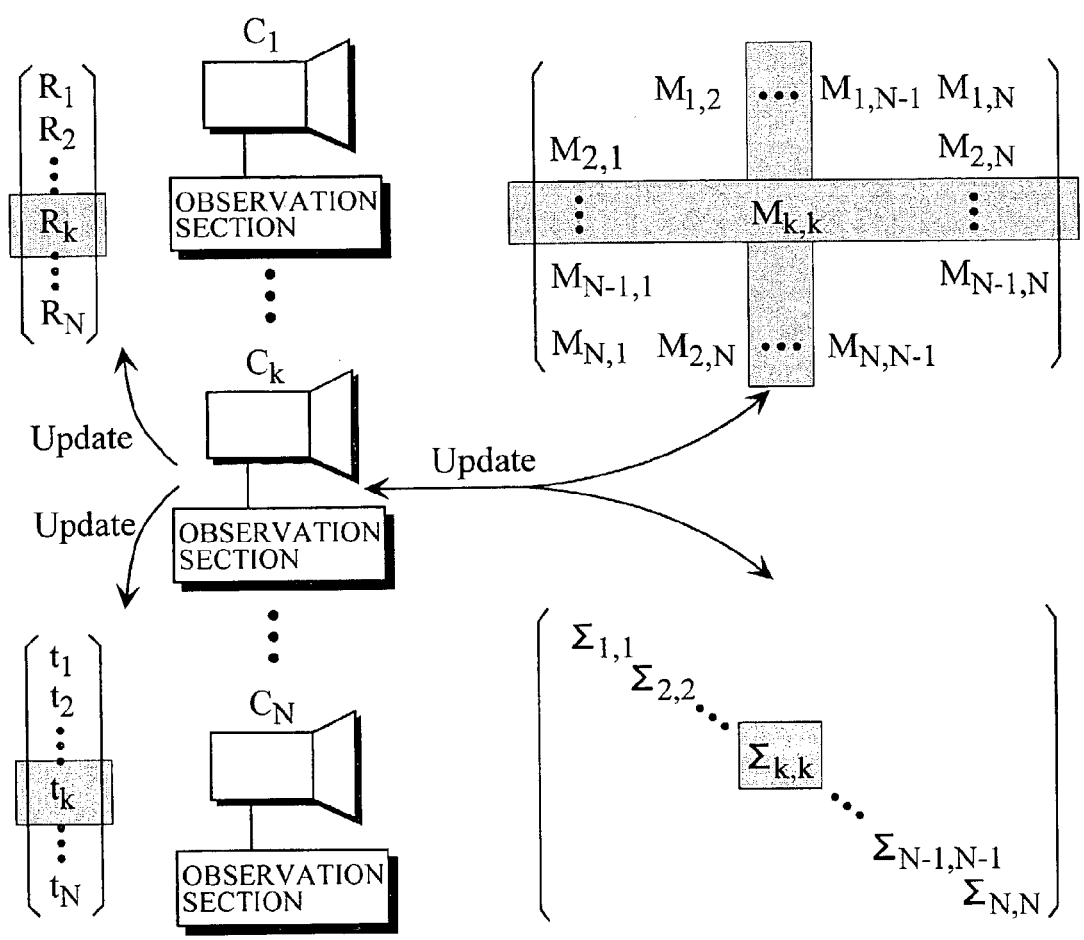
FIG. 4 is a schematic view showing the flow of the estimation of the position and posture of a camera.

FIG. 4 illustrates the flow of the estimation of the respective positions and postures of the cameras.

In FIG. 4, $C_i$ (i=1, 2, ... k, ..., N) denote the cameras, $t_i$ denotes the position of each of the cameras, $R_i$ denotes the posture of each of the cameras, $\Sigma_{ii}$ denotes a covariance matrix related to an estimated position value, and $M_{ij}$ denotes a matrix related to an estimated posture value.

Each of the cameras $C_i$ corrects the position and posture of the camera using observation information shared with the surrounding cameras every time a new observation is obtained and an estimated position value and an estimated posture value at that time point of each of the surrounding cameras. Here, the surrounding camera is a camera which may share the observation information with the camera $C_i$. In correcting the position and posture, a higher weight is given to the position and posture of a reference camera. In the present embodiment, the posture of one camera and the positions of two cameras are given as bases in order to determine world coordinates.

[2-1] Description of Observation Information Used for Estimating Position and Posture Description is made of observation information utilized for updating estimated position and posture values.

Here, with respect to the camera $C_k$, a matrix $m_{kl}$ related to a relative posture $(R_l R_k^{-1})$ between the camera $C_k$ and the camera $C_l$ and a direction (a relative position) $y_{kl}$ (=$R_k$ $(t_l - t_k)$) of the camera $C_l$ in a camera coordinate system of the camera $C_k$ shall be obtained as the observation information from a plurality of times of observations shared with the camera $C_l$. Although the matrix $m_{kl}$ related to the relative posture and the relative position $y_{kl}$ are found from the above-mentioned image features (the position of a representative point, and the distance on an image between a head vertex and a toe point), a method therefor will be described later.

The matrix $m_{kl}$ related to the relative posture is defined as follows:

Both cameras $C_k'$ and $C_l'$ respectively having the same postures as those of the cameras $C_k$ and $C_l$ shall be at the origin of world coordinates. Letting $R_k$ and $R_l$ be respectively the postures of the cameras $C_k$ and $C_l$, an observation point d observed in a direction $X_{k,d}$ on a camera coordinate system of $C_k'$ is observed in a direction $X_{l,d}$ indicated by the following equation (5) on the camera $C_l'$:

$$X_{l,d} = R_l R_k^{-1} X_{k,d} + e \qquad (5)$$

In the foregoing equation (5), e denotes an observation error.

The matrix $m_{kl}$ related to the relative posture is calculated on the basis of the following equation (6);

$$m_{kl} = \sum_{d=0}^{f} X_{k,d} X'_{l,d} \qquad (6)$$

In the foregoing equation (6), a mark "'" attached to $X_{l,d}$ denotes transposition. f denotes the number of times of observations. The relative posture $R_l R_k^{-1}$ between the cameras $C_k$ and $C_l$ can be found utilizing singular value decomposition from the foregoing equation (6) (see the following document 15).

Document 15: F. Landis Markley. Attitude determination using vector observations and the singular value decomposition. the Journal of the Astronautical Sciences, Vol. 36, No. 3, pp. 245–258, 1988.

Figure 5:
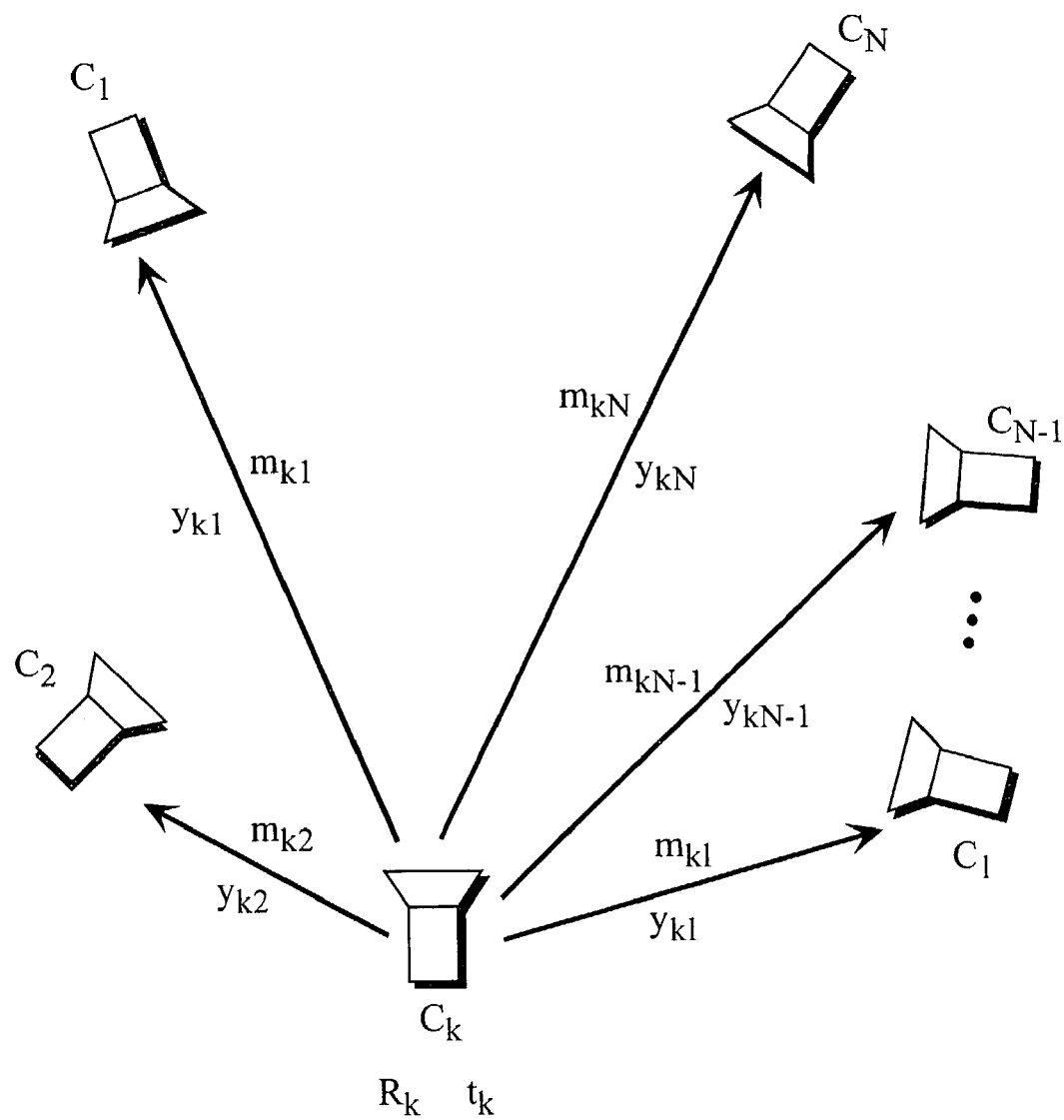
FIG. 5 is a schematic view for explaining a method of updating the position and posture of a camera.

As shown in FIG. 5, the position $t_k$ and the posture $R_k$ of the camera $C_k$ are estimated from the matrix $m_{kl}$ related to the relative posture found with respect to the camera $C_k$ and each of the cameras and the relative position $y_{kl}$.

[2-2] Description of Updating of Position and Posture

Description is now made of the updating of the position $t_k$ and the posture $R_k$ of the camera $C_k$ using the matrix $m_{kl}$ related to the relative posture between the cameras $C_k$ and $C_l$, as viewed from the camera $C_k$, and the relative position $y_{kl}$.

[2-2-1] Initial State

First, description is made of the initial states of the position $t_i$ of each of the cameras, a covariance matrix $\Sigma_{ii}$ related to an estimated position value, a posture $R_i$, and a matrix $M_{ij}$ related to an estimated posture value.

With respect to a reference camera $C_{t1}, \ldots C_{tn}$ ($n \geq 2$) forming a basis for a position, the position $t_{t1}, \ldots t_{tn}$ on world coordinates is given as an initial value.

With respect to the covariance matrix $\Sigma_{ii}$, an initial value as expressed by the following equation (7) is given:

$$\sum_{ii} = \begin{cases} p_1 I & (i \in [t_1, \ldots, t_n]) \\ p_2 I & (i \in [t_1, \ldots, t_n]) \end{cases} \qquad (7)$$

In the foregoing equation (7), $p_1$ and $p_2$ respectively denote weighting constants, where $p_1 \ll p_2$. Further, I denotes a unit matrix.

With respect to a reference camera $C_{r1}, \ldots C_{rm}$ ($m \geq 1$) forming a basis for a posture, the posture $R_{r1}, \ldots R_{rm}$ on the world coordinates is given as an initial value.

With respect to the matrix $M_{ij}$ related to the estimated posture value, an initial value as expressed by the following equation (8) is given:

$$M_{ij} = \begin{cases} q_1 R_{ri} & (i = j, i \in [r_1, \ldots, r_m]) \\ q_2 I & \text{(otherwise)} \end{cases} \qquad (8)$$

In the foregoing equation (8), $q_1$ and $q_2$ respectively denote weighting constants, where $q_1 \gg q_2$. Further, I denotes a unit matrix.

[2-2-2] Updating of Position and Posture

Every time an observation is newly obtained, an estimated value in each of the cameras is locally optimized, thereby finally obtaining estimated position and posture values of all the cameras.

As shown in FIG. 5, the camera $C_k$ holds estimated position values $t_i$ and estimated posture values $R_i$ of all the cameras $C_i$ ($i \neq k$) surrounding the camera $C_k$, a covariance matrix (information related to position estimation precision) $\Sigma_{ii}$ related to the estimated position values, a matrix $M_{kk}$ related to the posture of the camera $C_k$, and a matrix (information related to posture estimation precision) $M_{ki}$ related to the relative posture between the camera $C_k$ and each of the cameras $C_i$.

Description is made of a method of updating the estimated posture value $R_i$ and the estimated position value $t_i$ in a case where new observations $y_{kl}$ and $m_{kl}$ are obtained in the camera $C_k$.

Description is first made of the updating of the estimated posture value $R_i$.

The camera $C_k$ holds the estimated posture value $R_i$ of the surrounding camera and the matrix $M_{kl}$ related to the relative posture between the camera $C_k$ and each of the cameras $C_i$.

Here, the matrix $M_{kl}$ is updated using the matrix $m_{kl}$ related to the relative posture obtained by the observation and the following equation (9). Subscripts (t) and (t−1) represent time points in the following equation (9):

$$M_{kl}^{(t)} = \frac{1}{u} M_{kl}^{(t-1)} + m_{kl} \qquad (9)$$

In the foregoing equation (9), u denotes a forgetting factor.

The matrix $M_{kk}$ related to the posture of the camera $C_k$ is then updated using the following equation (10). In this case, the updated matrix $M_{kl}$ is used as $M_{kl}^{(t)}$.

$$M_{kk}^{(t)} = \sum_{j=0}^{N} R_i^{-1} M_{ki}^{(t)} (i \neq k) \qquad (10)$$

A new estimated posture value $R_k$ is obtained by singular value decomposition of $M_{kk}$.

Description is now made of the updating of the estimated position value $t_i$.

The camera $C_k$ holds, with respect to the position of each of the cameras, an estimated position value $t_i$ at the present time point and a covariance matrix $\Sigma_{ii}$ related thereto.

A new estimated position value $t_k$ is found using the relative position $y_{kl}$ obtained by the observation and the following equation (11):

$$t_k^{(t)} = t_k^{(t-1)} + K(H^{(t)} t_l^{(t-1)} - H^{(t)} t_k^{(t-1)}) \qquad (11)$$

In the foregoing equation (11), H is expressed by the following equation (12):

$$H^{(t)} = \begin{bmatrix} 1 & 0 & 0 \\ 0 & 1 & 0 \end{bmatrix} R_k^{-1} R_{kl}^{-1} \quad (12)$$

$R_{kl}$ denotes a rotation matrix satisfying the following equation (13):

$$R_{kl} \frac{y_{kl}}{\|y_{kl}\|} = [001]' \quad (13)$$

Furthermore, the covariance matrix $\Sigma_{kk}$ related to the estimated position value is updated using the following equation (14):

$$\sum\nolimits_{kk}^{(t)} = \sum\nolimits_{kk}^{(t-1)} - K^{(t)} H^{(t)} \sum\nolimits_{kk}^{(t-1)} \quad (14)$$

Here, K is expressed by the following equation (15):

$$K^{(t)} = \sum\nolimits_{kk}^{(t-1)} (H^{(t)})' \left( H^{(t)} \sum\nolimits_{kk}^{(t-1)} (H^{(t)})' + G \right)^{-1} \quad (15)$$

In the foregoing equation (15), G denotes an observation error.

The foregoing equations (11), (12), (14), and (15) are equations for updating the Kalman filter.

Figure 6:
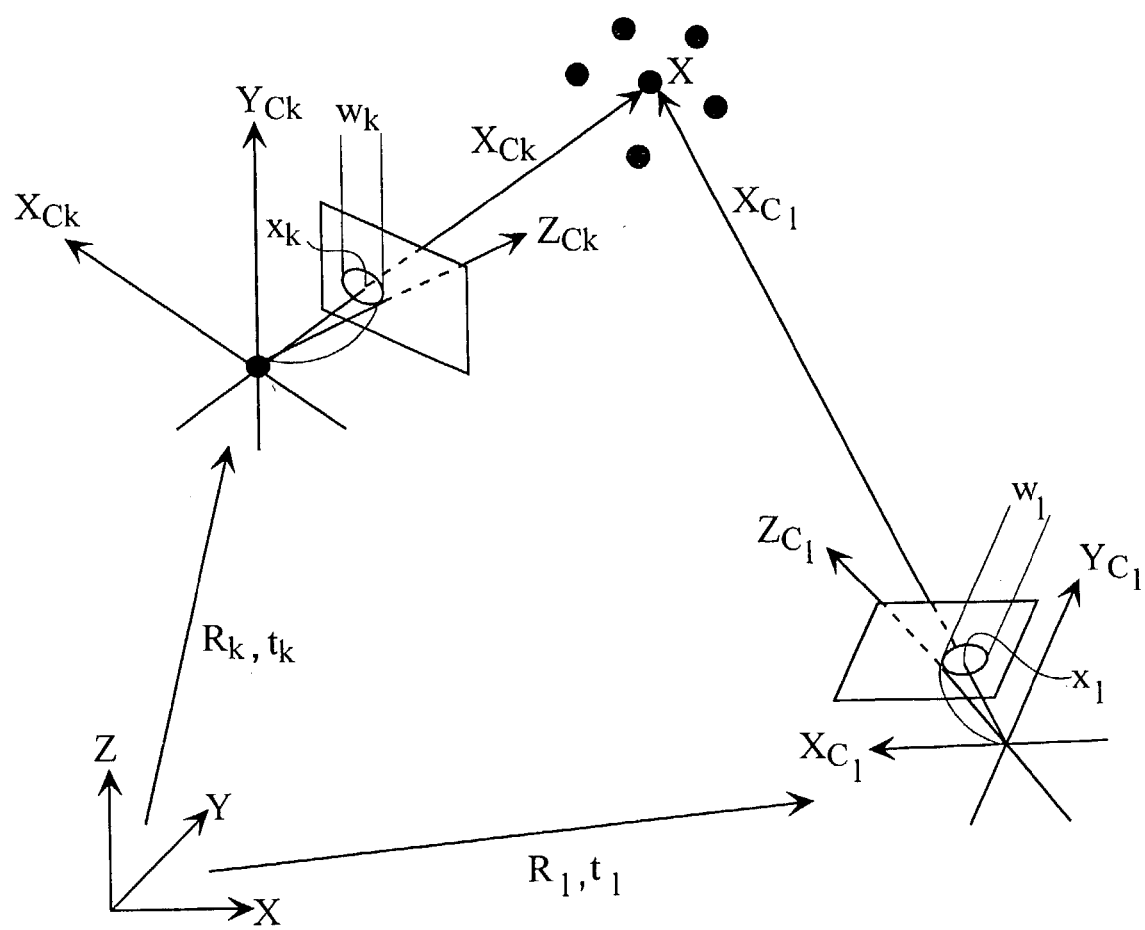
FIG. 6 is a schematic view for explaining a method of finding $m_{kl}$ and $y_{kl}$ from image features.

[2-3] Description of Method of Finding $m_{kl}$ and $y_{kl}$ from Image Features As shown in FIG. 6, let $x_k$ be an observation position on an image plane of the camera $C_k$ at a three-dimensional position X of a person (a feature point) in a world coordinate system (XYZ), and let $x_l$ be an observation position on an image plane of the camera $C_l$ at the three-dimensional position X.

When it is assumed that an internal parameter matrix $A_k$ of the camera $C_k$ is known, the relationship between the three-dimensional position X of the person in the world coordinate system and the observation position $x_k$ of the person on the image plane of the camera $C_k$ is expressed by the following equation (16) from a rotation matrix $R_k$ representing the posture of the camera $C_k$ and a translation vector $t_k$ representing the position thereof in the world coordinate system:

$$s \begin{bmatrix} x_k \\ 1 \end{bmatrix} = A_k [R_k \ t_k] \begin{bmatrix} X \\ 1 \end{bmatrix} = \begin{bmatrix} a_1 \\ a_2 \\ a_3 \end{bmatrix} [R_k \ t_k] \begin{bmatrix} X \\ 1 \end{bmatrix} \quad (16)$$

where $a_3 = [001]$

Here, letting $X_{ck}$ be the three-dimensional position of the person on a camera coordinate system $(X_{ck} Y_{ck} Z_{ck})$ of the camera $C_k$, a relationship expressed by the following equation (17) holds between $X_{ck}$ and X:

$$X_{ck} = [R_k \ t_k] \begin{bmatrix} X \\ 1 \end{bmatrix} \quad (17)$$

That is, the relationship between the observation position $x_k$ of the person on the image plane of the camera $C_k$ and the three-dimensional position $X_{ck}$ of the person in the camera coordinate system of the camera $C_k$ is expressed by the following equation (18):

$$s \begin{bmatrix} x_k \\ 1 \end{bmatrix} = A_k X_{ck} \quad (18)$$

The following equation (19) is obtained by deforming the foregoing equation (18):

$$X_{ck} = s A_k^{-1} \begin{bmatrix} x_k \\ 1 \end{bmatrix} = s \begin{bmatrix} a_{m1} \\ a_{m2} \\ a_{m3} \end{bmatrix} \begin{bmatrix} x_k \\ 1 \end{bmatrix} \quad (19)$$

Letting $Z_{xck}$ be the z component of $X_{ck}$, $Z_{xck}$ is expressed by the following equation (20):

$$Z_{xck} = s a_{m3} \begin{bmatrix} x_k \\ 1 \end{bmatrix} \quad (20)$$

On the other hand, when a weak perspective conversion is assumed with respect to the image features, and $w_k$ denotes the size of the feature point $x_k$ on the image plane (the distance on the image between the head vertex and the toe point in the present embodiment), $Z_{xck}$ is expressed by the following equation (21):

$$Z_{xck} \propto \frac{1}{w_k} \quad (21)$$

The following equation (22) holds from the foregoing equations (20) and (21):

$$s \propto \frac{1}{a_{m3} \begin{bmatrix} x_k \\ 1 \end{bmatrix}} \times \frac{1}{w_k} \quad (22)$$

Since $a_3 = [0 \ 0 \ 1]$, the equation (22) is rewritten into the following equation (23):

$$s \propto \frac{1}{w} \quad (23)$$

The following equation (24) is obtained from the foregoing equations (18) and (23):

$$X_{ck} \propto \frac{1}{w_k} A_k^{-1} \begin{bmatrix} x_k \\ 1 \end{bmatrix} \quad (24)$$

Letting $X_{cl}$ be the three-dimensional position of the person in the camera coordinate system $(X_{cl} Y_{cl} Z_{cl})$ of the camera $C_l$, $X_{cl}$ is also found similarly to $X_{ck}$, and is expressed by the following equation (25):

$$X_{cl} \propto \frac{1}{w_l} A_l^{-1} \begin{bmatrix} x_l \\ 1 \end{bmatrix} \quad (25)$$

In the foregoing equation (25), $A_l$ denotes an internal parameter matrix of the camera $C_l$, and $w_l$ denotes the size of the feature point $x_l$ on the image plane of the camera $C_l$ (the distance on the image between the head vertex and the toe point in the present embodiment).

$R_l$ denotes a rotation matrix representing the posture of the camera $C_l$ in the world coordinate system, and $t_l$ denotes a translation vector representing the position of the camera $C_l$ in the world coordinate system. When f times of observations are considered, the following equation (26) is obtained:

$$X_{ck,1} = R_k R_l^{-1} X_{cl,1} + R_k(t_l - t_k),$$
$$\vdots \quad (26)$$
$$X_{ck,f} = R_k R_l^{-1} X_{cl,f} + R_k(t_l - t_k).$$

When the average of $X_{ck}$ corresponding to f times of observations is found from the foregoing equation (26), the following equation (27) is obtained:

$$\overline{X}_{ck} = R_k R_l^{-1} \overline{X}_{cl} + R_k(t_l - t_k) \quad (27)$$

where $$\overline{X}_{ck} = \frac{1}{f} \Sigma_{d=1}^{f} X_{ck,d}$$

$$\overline{X}_{cl} = \frac{1}{f} \Sigma_{d=1}^{f} X_{cl,d}$$

The following equation (28) is found from the foregoing equations (26) and (27):

$$\hat{X}_{ck,1} \propto R_k R_l^{-1} \hat{X}_{cl,1},$$
$$\vdots \quad (28)$$
$$\hat{X}_{ck,f} \propto R_k R_l^{-1} \hat{X}_{cl,f}.$$

where $$\hat{X}_{ck,d} = \frac{(X_{ck,d} - \overline{X}_{ck})}{\|X_{ck,d} - \overline{X}_{ck}\|},$$

$$\hat{X}_{cl,d} = \frac{(X_{cl,d} - \overline{X}_{cl})}{\|X_{cl,d} - \overline{X}_{cl}\|}.$$

A rotation matrix satisfying the foregoing equation (28) is such $R_k R_L^{-1}$ that the following equation (29) reaches a minimum:

$$\sum_{d=1}^{f} \left\| \hat{X}_{ck,d} - (R_k R_l^{-1}) \hat{X}_{ck,d} \right\|^2 \to \min \quad (29)$$

This solution is found by decomposing a matrix $m_{kl}$ expressed by the following equation (30) into singular values:

$$m_{kl} = \sum_{d=0}^{f} \hat{X}_{ck,d} \hat{X}'_{cl,d} \quad (30)$$

On the other hand, a directional vector $y_{kl}$ ($=R_k(t_l-t_k)$) of the camera $C_l$, as viewed from the camera coordinate system of the camera $C_k$, is found by substituting the obtained relative posture $R_k R_L^{-1}$ in the foregoing equation (27):

[2-4] Verification Experiments

In order to assure the effectiveness of the above-mentioned calibration method, the following experiments were conducted.

Five cameras (cameras 1 to 5) were used, to previously give the position and posture of the camera 1 and the position of the camera 2 in order to determine the world coordinate system.

10000 points were selected at random from a region measuring 150×150×150 [cm] in a scene, and the two cameras were selected at random from the five cameras with respect to each of the points. The two-dimensional observation position and the two-dimensional size were calculated by each of the two cameras, and a Gaussian error was further added to the obtained two-dimensional observation position and two-dimensional size, to respectively find observations in the camera.

Calibration information related to the position and posture which are stored in each of the cameras was updated by each of the observations.

Figure 7:
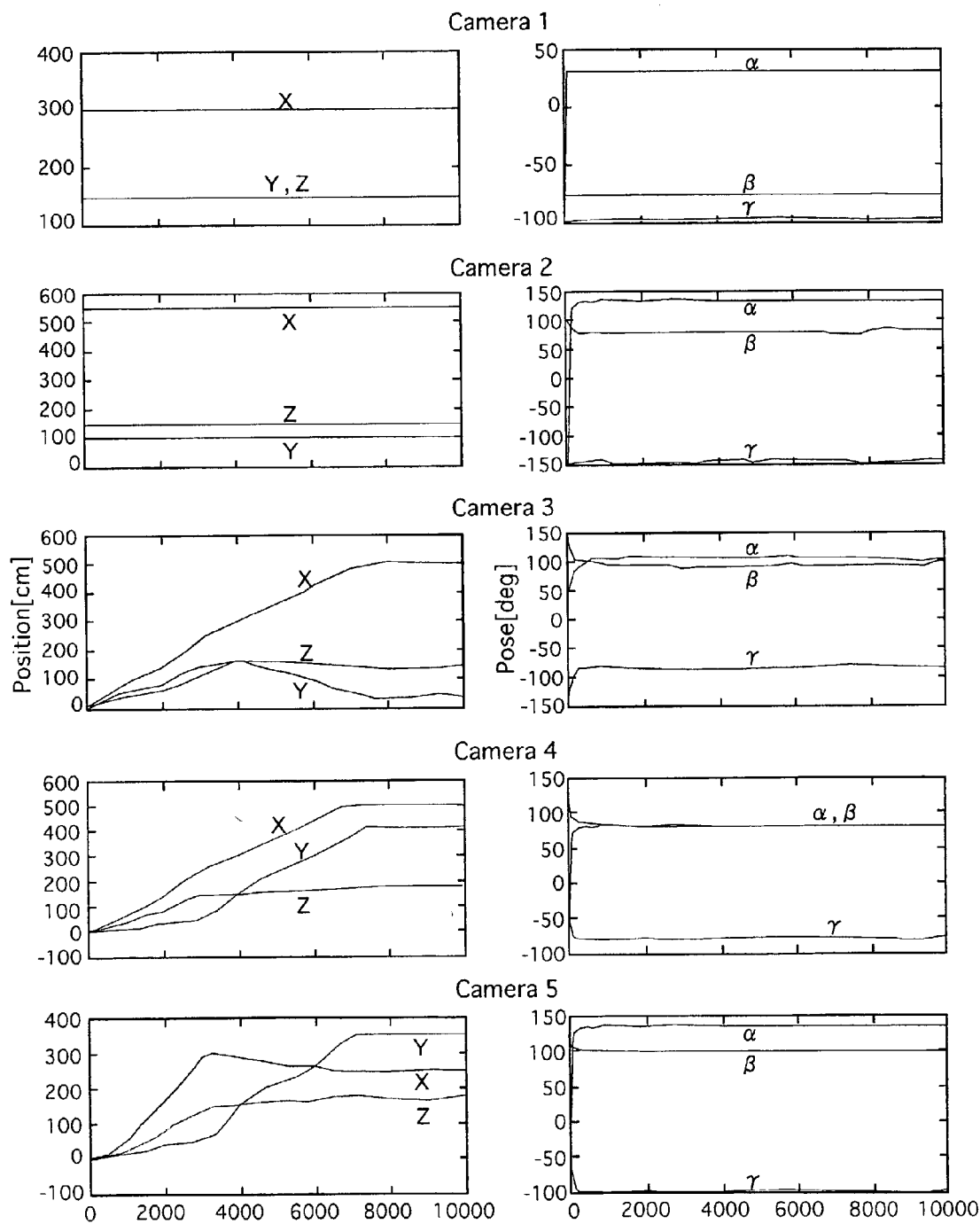
FIG. 7 is a graph showing the results of an experiment.

FIG. 7 illustrates the results of the estimation of camera parameters in all the cameras.

In FIG. 7, a graph on the left side indicates the results of the estimation of the positions X, Y, and Z of the camera. In FIG. 7, a graph on the right side indicates the results of the estimation of Euler's angles α, β, and γ respectively representing the postures of the camera. The number of data is used to enter the horizontal axis of each of the graphs.

As can be seen in FIG. 7, both the position and posture respectively include large errors in the initial stage of calibration. However, an estimation error decreases as the number of data increases, thereby finding that high estimation precisions of an average of 7.35 [cm] in position and an average of 0.85 [deg] in posture are finally obtained. The foregoing results show that the respective positions and postures of a lot of cameras can be estimated by the calibration method shown in the above-mentioned embodiment.

[3] Description of Modified Example of Camera Position and Posture Estimation Algorithm (Camera Calibration Algorithm)

In this modified example, the respective positions and postures of all cameras in a system are estimated while achieving geometrical alignment between the two cameras using observation information shared between the cameras. As a basis for giving the world coordinate system, it is necessary to give the positions of the two cameras and the posture of the one camera. The reference cameras need not necessarily share an observation with all the cameras to be calibrated.

Two-dimensional observation information on each of the cameras is obtained in the following manner. First, an input image is divided into a person region and a background region. A head vertex and a toe point are extracted from the person region as two-dimensional observation information used for estimating the position and posture of the camera.

In a multi-viewpoint system, for example, the above-mentioned person tracking system, description is now made of a method of estimating the respective positions and postures of all the cameras in the system while achieving geometrical alignment between the two cameras using the observation information shared between the two cameras.

In order to estimate the respective positions and postures of the cameras, the estimated values of the position and posture of each of the cameras must be held. However, information to be held increase as the number of cameras increases, thereby making it difficult to manage the information in a one-dimensional manner. In this method, therefore, it is considered that the observation information is held in a distributed manner for the cameras, to estimate the respective positions and postures of the cameras in a distributed manner.

First, an internal parameter in each of the cameras is calculated by an algorithm in Tsai (see the following document 16). Since the internal parameter is independent of the existence of the other camera and the changes in the position and posture thereof, it is considered that there is no problem if the internal parameter and the position and posture are separately calculated. In the following processing, the internal parameter in each of the cameras is known and fixed, to estimate only the position and posture of the camera.

Document 16: Roger Y. Tsai. A versatile camera calibration technique for high-accuracy 3d machine vision metrology using off-the shelf tv cameras and lenses, IEEE Journal of Robotics and Automation, Vol. 3, No. 4, pp. 323–344, 1987.

Figure 8:
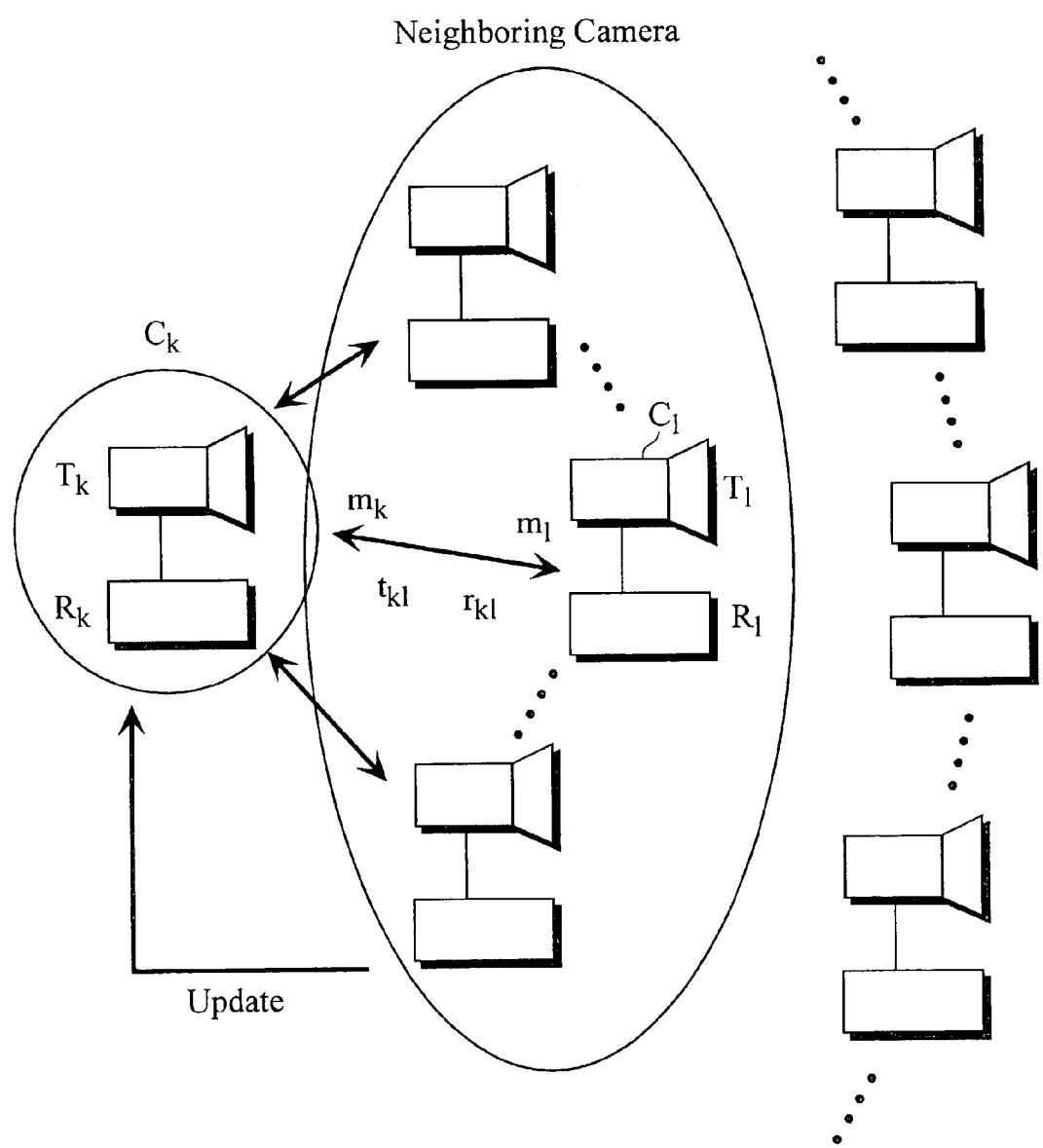
FIG. 8 is a schematic view showing the flow of the estimation of the position and posture of a camera.

FIG. 8 illustrates the flow of the estimation of the respective positions and postures of the cameras.

In each of the cameras, the position and posture of the camera are estimated utilizing observation information related to the surrounding cameras sharing an observation with the camera and the estimated values of the position and posture of the camera. Every time a new observation is obtained, the estimation is repeated. The above-mentioned processing is repeated in a distributed manner by all the cameras, thereby making it possible to find the respective positions and postures of the cameras in the overall system.

Description is now made of the details of the estimation of the respective positions and postures of the cameras.

[3-1] Geometrical Constraint Between Two Cameras

Here, description is simply made of epipolar geometry related to an observation between the two cameras.

It is assumed that the camera $C_k$ and the camera $C_l$ observe the same three-dimensional point i, and two-dimensional observation positions on the cameras $C_k$ and $C_l$ are respectively $x_{k,i}=(x_{k,i}, y_{k,i})$ and $x_{l,i}=(x_{l,i}, y_{l,i})^t$.

The observations are expressed by the following equations (31) and (32) in a homogeneous coordinate system:

$$m_{k,i} = \frac{1}{\|x_{k,i}^2 + y_{k,i}^2 + f_k^2\|} \begin{bmatrix} x_{k,i} \\ y_{k,i} \\ f_k \end{bmatrix} \quad (31)$$

$$m_{l,i} = \frac{1}{\|x_{l,i}^2 + y_{l,i}^2 + f_l^2\|} \begin{bmatrix} x_{l,i} \\ y_{l,i} \\ f_l \end{bmatrix} \quad (32)$$

Here, $f_k$ and $f_l$ respectively denote the focal lengths of the cameras $C_k$ and $C_l$.

Letting $t_{kl}$ and $r_{kl}$ be respectively the relative position and posture of the camera $C_l$ in a coordinate system of the camera $C_k$, $m_{k,i}$ and $m_{l,i}$ satisfy the following equation (33):

$$m_{k,i}^t E_{kl} m_{l,i} = 0 \quad (33)$$

Here, $E_{kl}$ is expressed by the following equation (34)

$$E_{kl} = [t_{kl}] \times r_{kl}, \; [t_{kl}] = \begin{bmatrix} 0 & -t_3 & t_2 \\ t_3 & 0 & -t_1 \\ -t_2 & t_1 & 0 \end{bmatrix} \quad (34)$$

[3-2] Estimation of Position and Posture of Camera

Description is made of a method of estimating the respective positions and postures in the world coordinate system of all the cameras in the system using the relationship described in the foregoing item [3-1].

Here, consider N cameras. Let $T_k$ and $R_k$ (k=1, . . . , N) be respectively the position and posture of the camera $C_k$ in the world coordinate system. When the cameras $C_p$ and $C_q$ observe the three-dimensional point i, as described in the foregoing item [3-1], the foregoing equation (33) must be satisfied, letting $x_{p,i}$ and $x_{q,i}$ be respectively the two-dimensional observation positions on the cameras.

If it is assumed that $n_{pq}$ observations shared between the cameras $C_p$ and $C_q$ are obtained, the relative position and posture $t_{pq}$ and $r_{pq}$ of the camera $C_q$ in a coordinate system of the camera $C_p$ satisfy the following equation (35):

$$\sum_{i=1}^{n_{pq}} (m_{p,i}^t [t_{pq}] \times r_{pq} m_{q,i})^2 = 0 \quad (35)$$

If it is assumed that eight or more observations are obtained between the cameras $C_p$ and $C_q$, $t_{pq}$ and $r_{pq}$ can be found by minimizing the left side in the foregoing equation (35), as expressed by the following equation (36):

$$\sum_{i=1}^{n_{pq}} (m_{p,i}^t [t_{pq}] \times r_{pq} m_{q,i})^2 \rightarrow \min \quad (36)$$

When the cameras in the overall system are considered, all observations between the two cameras in the system must be considered, thereby minimizing an error $J_{all}$ related to the overall system, as expressed by the following equation (37):

$$J_{all} \rightarrow \min \quad (37)$$

$$J_{all} = \sum_{q=1}^{N} \sum_{\substack{p=1 \\ (p \neq q)}}^{N} \sum_{i=1}^{n_{pq}} (m_{p,i}^t [t_{pq}] \times r_{pq} m_{q,i})^2$$

The relative position and posture $t_{pq}$ and $r_{pq}$ of the camera $C_q$ in the coordinate system of the camera $C_p$ can be expressed by the following equations (38) and (39) from the respective positions $T_p$ and $T_q$ and postures $R_p$ and $R_q$ in the world coordinate system of the cameras $C_p$ and $C_q$:

$$t_{pq} = R_p \frac{T_q - T_p}{\|T_q - T_p\|} \quad (38)$$

$$r_{pq} = R_p R_q^{-1} \quad (39)$$

Consequently, the foregoing equation (37) is changed into the following equation (40):

$$J_{all} = \sum_{q=1}^{N} \sum_{\substack{p=1 \\ (p \neq q)}}^{N} \sum_{i=1}^{n_{pq}} \left( m_{p,i}^t R_p \left[ \frac{T_p - T_q}{\|T_p - T_q\|} \right] \times R_p R_q^{-1} m_{q,i} \right)^2$$

$$= \sum_{q=1}^{N} \sum_{\substack{p=1 \\ (p \neq q)}}^{N} \sum_{i=1}^{n_{pq}} \left( R_p^{-1} m_{q,i}^t \left[ \frac{T_p - T_q}{\|T_p - T_q\|} \right] \times R_q^{-1} m_{q,i} \right)^2 \quad (40)$$

Consequently, the respective positions and postures $R_1, \ldots, R_N$ and $T_1, \ldots, T_N$ of all the cameras can be calculated by minimizing $J_{all}$.

In order to minimize $J_{all}$, observation information related to the overall system is required. However, the amount of observation information required for the minimization increases as the number of cameras increases, so that the communication cost for exchanging the observation information between the cameras also increases. Therefore, it is considered that $J_{all}$ is not minimized at one time with respect to the respective positions and postures $R_1, \ldots, R_N$ and $T_1, \ldots, T_N$ of all the cameras but minimized finally by being minimized in a distributed manner with respect to the cameras.

Here, consider the minimization of $J_{all}$ related to the camera $C_k$. First, $J_{all}$ is divided into a term including information related to the camera $C_k$ (the position and posture of the camera $C_k$, observation information) and a term including no information. The terms are respectively taken as $J_K$ and $J_{other}$. $J_K$, $J_{other}$, and $J_{all}$ are expressed by the following equations (41), (42), and (43):

$$J_k = \sum_{\substack{q=1 \\ (q \neq k)}}^{N} \sum_{i}^{n_{kq}} \left( R_k^{-1} m_{k,i}^t \left[ \frac{T_q - T_k}{\|T_q - T_k\|} \right] \times R_q^{-1} m_{q,i} \right)^2 + \quad (41)$$

$$\sum_{\substack{p=1 \\ (p \neq k)}}^{N} \sum_{i}^{n_{pk}} \left( R_p^{-1} m_{p,i}^t \left[ \frac{T_k - T_p}{\|T_k - T_p\|} \right] \times R_k^{-1} m_{k,i} \right)^2$$

$$2 \sum_{p=1}^{N} \sum_{i}^{n_{pk}} \left( R_p^{-1} m_{p,i}^t \left[ \frac{T_k - T_p}{\|T_k - T_p\|} \right] \times R_k^{-1} m_{k,i} \right)^2$$

$$J_{other} = \sum_{\substack{q=1 \\ (q \neq k)}}^{N} \sum_{\substack{p=1 \\ (p \neq k,q)}}^{N} \sum_{i}^{n_{pq}} \left( R_p^{-1} m_{p,i}^t \left[ \frac{T_q - T_p}{\|T_q - T_p\|} \right] \times R_q^{-1} m_{q,i} \right)^2 \quad (42)$$

$$J_{all} = J_k + J_{other} \quad (43)$$

$J_k$ is then minimized with respect to $R_k$ and $T_k$. Here, $J_{other}$ does not include the term related to the camera $C_k$. Even if $R_k$ and $T_k$ are changed by minimizing $J_k$, therefore, $J_{other}$ is not changed.

In order to minimize $J_k$ on the camera $C_k$, only an observation obtained on the camera $C_k$ and an observation, of a camera, shared with the camera $C_k$ are required. In each of the cameras, therefore, only information related to the camera may be stored, as shown in FIG. 8, thereby making it possible to reduce the amount of information, which should be stored in the camera, required to estimate the position and posture of the camera.

The minimization is independently performed with respect to all the cameras $C_k$ (k=1, ..., N), thereby making it possible to finally minimize the error $J_{all}$ in the overall system.

As described in the foregoing, processing for storing observation data required to estimate the position and posture of each of the cameras and estimating the position and posture of the camera is performed in a distributed manner in the cameras in this method. Accordingly, it is considered that the method is suitable for a distributing system.

Description is now made of the minimization of $J_k$ performed in a distributed manner in the cameras.

[3-2-1] Estimation of Position and Posture of Camera by Information Related to Surrounding Cameras Description is herein made of a method of minimizing the error $J_k$ related to the camera $C_k$ and estimating the position and posture $T_k$ and $R_k$ of the camera $C_k$.

(1) Calculation of Initial Estimated Values $R_k^{(1)}$ of $R_k$ and $T_k$

A group of cameras G (G={$C_{g1}, C_{g2}, \ldots, C_{gm}$}), whose respective positions and postures are known or whose initial estimated position and posture values have already been determined, sharing not less than a predetermined number of observations, out of cameras surrounding the camera $C_k$ is selected.

In the group of cameras G, the estimated posture value $R_k$ in the world coordinate system of the camera $C_k$ is calculated on the basis of the following equation (44) from the relative relationship between the camera $C_k$ and the camera $C_l$ which shares the largest number of observations with the camera $C_k$:

$$R_k = r_{lk} R_l \quad (44)$$

Here, $r_{lk}$ can be calculated by decomposing $E_{kl}$ satisfying the foregoing equation (36) into $r_{kl}$ and $t_{kl}$ using eigen value decomposition and singular value decomposition (see the following document 17):

Document 17: M. E. Spetsakis and J. (Y.) Aloimonos. Optimal computing of structure from motion using point correspondences in two frames. In Proc. of ICCV, pp. 449–453, 1998.

$J_k'$ is defined, as expressed by the following equation (45), utilizing only the observations shared with the group of cameras G:

$$J_k' = \sum_{p \in \{g_1, g_2, \cdots g_m\}} \sum_{i}^{n_{pk}} \left( R_p^{-1} m_{p,i}^t \cdot \left[ \frac{T_k - T_p}{\|T_k - T_p\|} \right] \times R_k^{-1} m_{k,i} \right)^2 \quad (45)$$

Such $T_k$ that $J_k'$ reaches a minimum is then calculated, as expressed by the following equation (46):

$$\frac{dJ'_k}{dT_k} = 0 \quad (46)$$

When $J_k' < \epsilon$ ($\epsilon$ is a threshold value), the estimated position and posture values $T_k$ and $R_k$ of the camera $C_k$ which are calculated in the foregoing manner are respectively taken as initial estimated position and posture values $T_k^{(1)}$ and $R_k^{(1)}$.

(2) Calculation of $T_k^{(t)}$ in $R_k^{(t-1)}$

As such $T_k$ that $J_k$ reaches a minimum, $T_k$ satisfying the following equation (47) may be found:

$$\frac{dJ_k}{dT_k} = 0 \quad (47)$$

$T_k$ satisfying the foregoing equation (47) can be calculated as a function of $R_1, \ldots, R_N, \ldots, T_1, \ldots, T_N$, as expressed by the following equation (48):

$$T_k = f(R_1, \ldots, R_N, T_1, \ldots, T_N) \quad (48)$$

(3) Updating of $R_k^{(t)}$ $J_k$ related to $R_k$ is minimized by numerical calculation.

Letting ($\Delta_{\omega 1}$ $\Delta_{\omega 2}$ $\Delta_{\omega 3}$) be respectively slight rotations around the X-axis, the Y-axis, and the Z-axis, and $\Delta R$ be a slight rotation matrix, $\Delta R$ is expressed by the following equation (49):

$$\Delta R = \begin{bmatrix} 0 & -\Delta\omega_3 & \Delta\omega_2 \\ \Delta\omega_3 & 0 & -\Delta\omega_1 \\ -\Delta\omega_2 & \Delta\omega_1 & 0 \end{bmatrix} \quad (49)$$

Here, ($\Delta_{\omega 1}$ $\Delta_{\omega 2}$ $\Delta_{\omega 3}$) satisfying the following equation (50) is calculated, letting $R_k^{(t)} = \Delta R R_k^{(t-1)}$ (see the forgoing document 17):

$$J_k(R_k^{(t)}) < J_k(R_k^{(t-1)}) \quad (50)$$

Such $R_k$ that $J_k$ reaches a minimum can be found by repeating the foregoing calculations:

The position and posture of the camera $C_k$ can be found by the procedure herein described. Further, the respective positions and postures of all the cameras satisfying the foregoing equation (40) can be found by repeating the foregoing procedure by all the cameras.

[3-3] Installation of New Camera and Deletion of Camera

When a new camera is installed in a multi-viewpoint system, for example, the above-mentioned person tracking system, the initial posture is calculated from the relative relationship between the new camera and the surrounding camera, whose posture is known, sharing an observation with the new camera as at the time of initial calibration, to start the estimation of the position and posture.

When the camera is deleted, a term related to the camera to be deleted is deleted from the evaluated value $J_{all}$.

[3-4] Correction of Time Difference Between Observations

In the estimation of the position and posture of the camera by the method, the results of the observations at the same time between the two cameras are required. However, the person tracking system described in the foregoing item [1] is an asynchronous system. Accordingly, the times at which the observations are carried out generally differ. Therefore, the time difference in the observation between the two cameras must be corrected.

Letting $x_k(t)$ be the two-dimensional observation position at the time t with respect to the camera $C_k$. It is assumed that observations $x_k(t_1)$ and $x_k(t_3)$ by the camera $C_k$ and an observation $x_l(t_2)$ by the camera $C_l$ are obtained. Here, $t_1 < t_2 < t_3$ and $t_3 - t_1 < \epsilon$.

At this time, a corrected observation position $\hat{x}_k(t_2)$ in the camera $C_k$ is found from the following equation (51). The obtained $\hat{x}_k(t_2)$ and $x_l(t_2)$ are used for estimating the position and posture as corresponding observations between the cameras $C_k$ and $C_l$.

$$\hat{x}_k(t_2) = x_k(t_1) + \frac{t_2 - t_1}{t_3 - t_1}(x_k(t_3) - x_k(t_1)) \quad (51)$$

[3-5] Experiments

Figure 9:
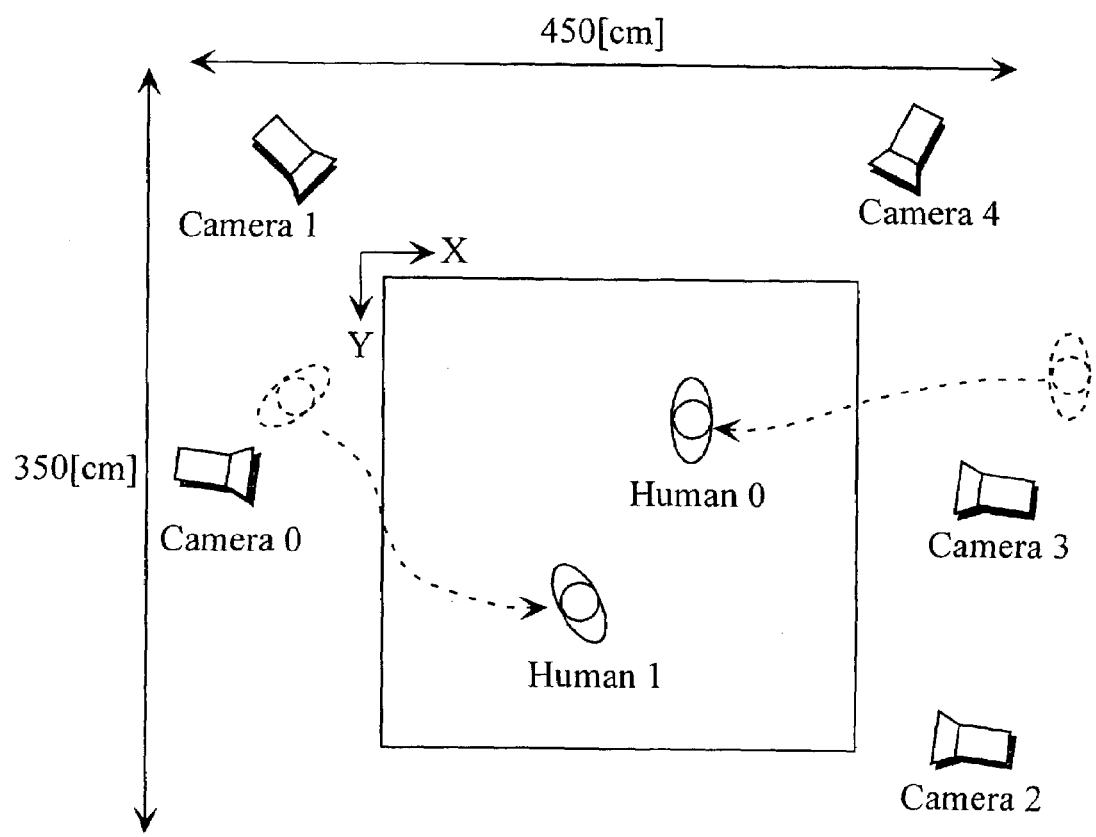
FIG. 9 is a schematic view showing an example of the arrangement of a camera used in an experiment.

Experiments were first conducted by a system comprising four cameras. The four cameras (cameras 1 to 4) were arranged, as shown in FIG. 9, to previously give the position and posture of the camera 1 and the position of the camera 2 in order to determine a world coordinate system. In order to evaluate the precision of estimated values, the position and posture of each of the cameras were found by manual work.

Figure 10:
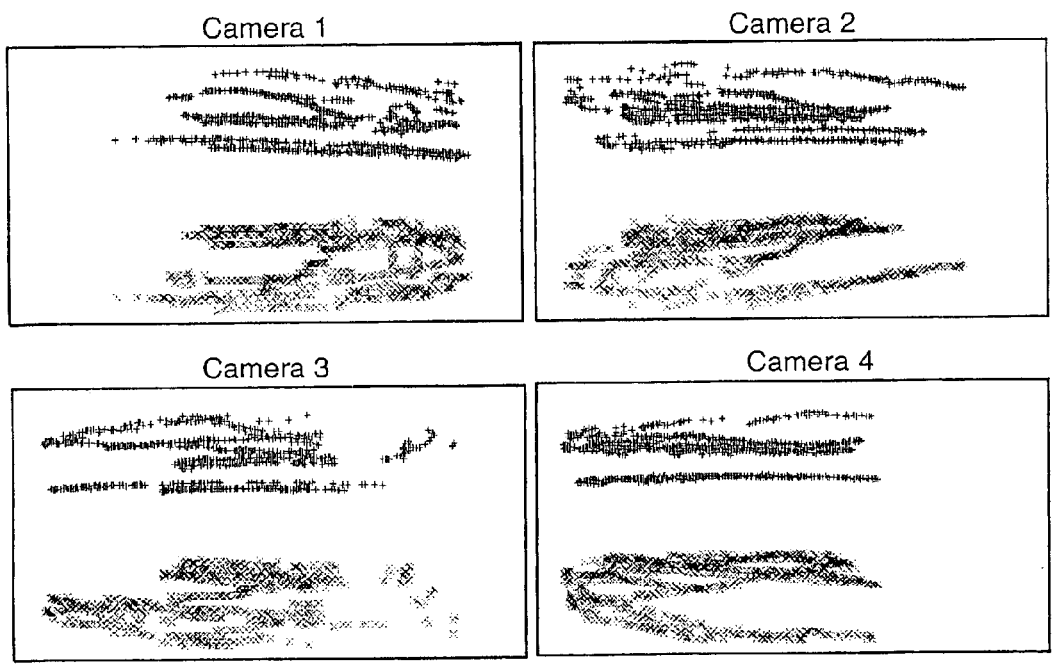
FIG. 10 is a graph showing two-dimensional observation information obtained in each of cameras (camera 1-4) shown in FIG. 9.

An observation for about three minutes was carried out with respect to a person who moves within a scene by the five cameras. At this time, two-dimensional observation information obtained by each of the cameras 1 to 4 is illustrated in FIG. 10.

Here, approximately 500 sets of observation information shared between the two cameras were obtained from the obtained observation information. The position and posture of each of the cameras are updated by the observation information.

Figure 11:
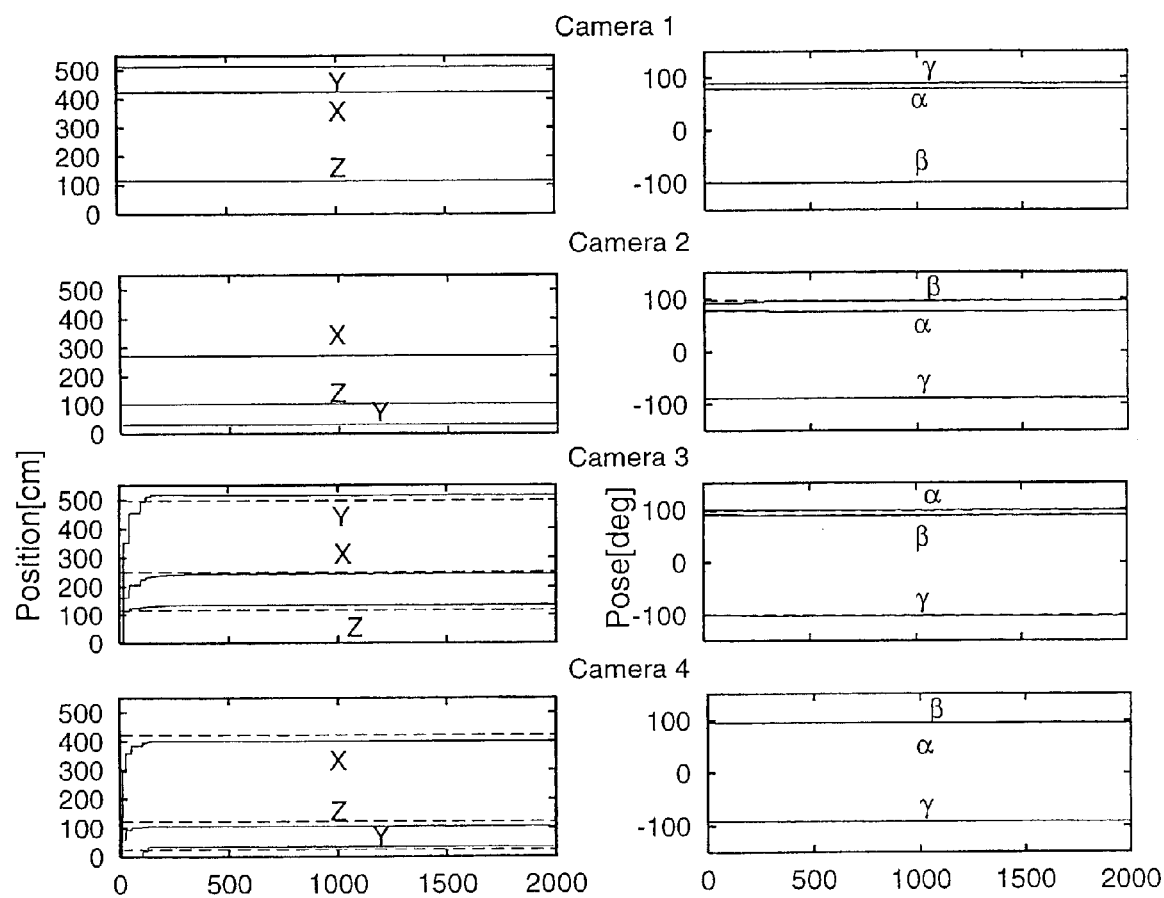
FIG. 11 is a graph showing the results of an experiment.

FIG. 11 illustrates the results of the estimation of all camera parameters. In FIG. 11, a graph on the left side indicates the results of the estimation of the positions X, Y, and Z of the camera. In FIG. 11, a graph on the right side indicates the results of the estimation of Euler's angles $\alpha$, $\beta$, and $\gamma$ respectively representing the postures of the camera. The number of data is used to enter the horizontal axis of each of the graphs.

As can be seen in FIG. 11, both the position and posture respectively include large errors in the initial stage of calibration. However, an estimation error decreases as the number of data increases, thereby finding that respective high estimation precisions of about 10 [cm] or less in position and about 3 [deg] or less in posture are finally obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. In an automatic camera calibration method in a system comprising a plurality of cameras, the automatic camera calibration method comprising the step of:

storing camera information, the camera information including a posture of one camera of the plurality of cameras, a position of one of plurality of cameras and a position of another one of the plurality of cameras;

providing an observing camera directed towards a person to be tracked, the observing camera having at least one of its posture and its position stored as camera information;

observing via the observing camera the person being tracked;

extracting feature amounts of a person being tracked on a basis of an input image of the person being tracked from one camera, the feature amounts being at least one of a position of representative point of the person being tracked, a position of a head of the person being tracked and color of clothes of the person being tracked;

corresponding the feature amounts, the posture of the one camera, the position of one camera and the position of another camera to a tracking model;

processing the feature amounts, the posture of the one camera, the position of one camera and the position of another camera in conjunction with an observation time after the feature amounts, the posture of the one camera, the position of one camera and the position of another camera are corresponded to the tracking model to generate observation information; and updating, for each of the cameras, the estimated values of the position and posture of the one camera on the basis of the observation information shared with the other surrounding cameras and the estimated values of the respective current positions and postures of the surrounding cameras, thereby automatically calibrating the plurality of cameras using feature amounts, the posture of the one camera, the position of one camera and the position of another camera and without using a world coordinate system.

2. The automatic camera calibration method according to claim 1, wherein
the observation information is the two-dimensional coordinate value of an image to be observed on an image plane of the camera and the size of the image to be observed.

3. The automatic camera calibration method according to claim 1, wherein
processing for updating the estimated values of the position and posture of each of the cameras comprises
a first step of calculating information related to the relative posture and relative position between the one camera and the other surrounding cameras on the basis of the observation information shared with the other surrounding cameras and the estimated values of the respective current positions and postures of the one camera and the other surrounding cameras, and
a second step of updating the estimated values of the position and posture of the one camera on the basis of the information related to the relative posture and relative position calculated in the first step.

4. The automatic camera calibration method according to claim 3, wherein each of the cameras holds the estimated value of the posture of each of the surrounding cameras, information related to the estimation precision of the respective postures of the one camera and each of the surrounding cameras, the estimated value of the position of each of the surrounding cameras, and the estimation precision of the respective positions of the one camera and each of the surrounding cameras, and said second step of updating the estimated values of the position and posture of each of the cameras comprising the steps of updating the estimated value of the posture of the one camera on the basis of the information related to the relative posture calculated in said first step, the estimated value of the posture of each of the surrounding cameras which is held by the one camera, and the information related to the estimation precision of the respective postures of the one camera and each of the surrounding cameras, and updating the estimated value of the position of the one camera on the basis of the information related to the relative position calculated in said first step, the estimated value of the position of each of the surrounding cameras which is held by the one camera, and the information related to the estimation precision of the respective positions of the one camera and each of the surrounding cameras.

5. The automatic camera calibration method according to claim 1, wherein
the processing for updating the estimated values of the position and posture of each of the cameras is performed every time new observation information is obtained in the one camera.

6. The automatic camera calibration method according to claim 1, wherein
the posture in a world coordinate system of at least one camera and the positions in the world coordinate system of at least two cameras are given as bases in order to determine world coordinates.

7. The automatic camera calibration method according to claim 1, wherein
the observation information is the two-dimensional coordinate value of an image to be observed on the image plane shared between at least the two cameras.

8. The automatic camera calibration method according to claim 7, wherein
in the processing for updating the estimated values of the position and posture of each of the cameras, processing for updating the estimated values of the position and posture of the one camera on the basis of the observation information shared with the other surrounding cameras and the estimated values of the respective current positions and postures of the other surrounding cameras is performed in a distributed manner for the plurality of cameras.

* * * * *